(12) United States Patent
Nakajima (10) Patent No.: US 10,269,470 B2
(45) Date of Patent: Apr. 23, 2019

(54) CABLE CORE AND TRANSMISSION CABLE

(71) Applicant: JUNKOSHA INC., Kasama-shi, Ibaraki (JP)

(72) Inventor: Takeshi Nakajima, Kasama (JP)

(73) Assignee: JUNKOSHA INC., Kasama-Shi (JP)

(*) Notice: Subject to any disclaimer, the term of this patent is extended or adjusted under 35 U.S.C. 154(b) by 0 days.

(21) Appl. No.: 15/753,489

(22) PCT Filed: Aug. 17, 2016

(86) PCT No.: PCT/JP2016/074040
§ 371 (c)(1),
(2) Date: Feb. 19, 2018

(87) PCT Pub. No.: WO2017/030152
PCT Pub. Date: Feb. 23, 2017

(65) Prior Publication Data
US 2018/0240572 A1   Aug. 23, 2018

(30) Foreign Application Priority Data

Aug. 20, 2015  (JP) ................. 2015-162883
Sep. 10, 2015  (JP) ................. 2015-178968
Apr. 3, 2016   (JP) ................. 2016-074815

(51) Int. Cl.
*H01B 7/00*   (2006.01)
*H01B 11/18*  (2006.01)
(Continued)

(52) U.S. Cl.
CPC ...... *H01B 11/1808* (2013.01); *B29C 47/0004* (2013.01); *B29C 47/0014* (2013.01);
(Continued)

(58) Field of Classification Search
CPC ... H01B 7/02; H01B 7/04; H01B 9/02; H01B 9/04; H01B 11/02; H01B 11/1808
(Continued)

(56) References Cited

U.S. PATENT DOCUMENTS 5,158,986 A * 10/1992 Cha ................. B29C 44/3446
                                                264/50
5,814,768 A *  9/1998 Wessels ............... H01B 11/02
                                              174/110 FC
(Continued)

FOREIGN PATENT DOCUMENTS

CN   102254608   11/2011
CN   103650066   3/2014
(Continued)

OTHER PUBLICATIONS

International Search Report of PCT/JP2016/074040, dated Sep. 13, 2016, English translation included, 3 pages.
(Continued)

*Primary Examiner* — William H Mayo, III
(74) *Attorney, Agent, or Firm* — Rankin, Hill & Clark LLP (57) ABSTRACT

A cable core includes: an internal conductor; a foamed dielectric that includes a fluororesin and is formed on the internal conductor by extrusion molding; and a skin layer that covers the foamed dielectric, and is configured such that a foaming rate of the foamed dielectric is 80% or more, an average foamed cell diameter of the foamed dielectric is 10 µm or less, and a standard deviation of a foamed cell diameter of the foamed dielectric is 2.5 or less.

5 Claims, 5 Drawing Sheets (51) Int. Cl.
*B29C 47/02* (2006.01)
*C08J 9/12* (2006.01)
*H01B 3/44* (2006.01)
*H01B 7/02* (2006.01)
*B29C 47/00* (2006.01)
*B29C 47/06* (2006.01)
*B29K 27/12* (2006.01)
*B29K 105/04* (2006.01)
*B29K 705/10* (2006.01)
*B29K 705/14* (2006.01)
*B29L 31/34* (2006.01)

(52) U.S. Cl.
CPC ...... *B29C 47/0042* (2013.01); *B29C 47/0085* (2013.01); *B29C 47/02* (2013.01); *B29C 47/025* (2013.01); *B29C 47/065* (2013.01); *C08J 9/12* (2013.01); *H01B 3/44* (2013.01); *H01B 3/445* (2013.01); *H01B 7/02* (2013.01); *H01B 7/0216* (2013.01); *H01B 7/0275* (2013.01); *B29K 2027/12* (2013.01); *B29K 2105/043* (2013.01); *B29K 2705/10* (2013.01); *B29K 2705/14* (2013.01); *B29L 2031/3462* (2013.01)

(58) Field of Classification Search
USPC ............... 174/110 R, 110 SC, 113 R, 113 SC
See application file for complete search history.

(56) References Cited

U.S. PATENT DOCUMENTS

| | | | | |
|---|---|---|---|---|
| 6,284,810 B1* | 9/2001 | Burnham | ............... | B29C 44/322 264/45.9 |
| 6,884,377 B1* | 4/2005 | Burnham | ............... | B29C 44/322 264/50 |
| 2001/0000930 A1* | 5/2001 | Kim | ............... | B29C 44/322 264/1.24 |
| 2006/0088680 A1* | 4/2006 | Kitahara | ............... | B32B 1/08 428/36.9 |
| 2008/0153936 A1* | 6/2008 | Venkataraman | ....... | C08J 9/0033 521/145 |
| 2009/0038821 A1* | 2/2009 | Sato | ............... | C08F 214/262 174/120 R |
| 2009/0148665 A1* | 6/2009 | Thiagarajan | ....... | B29C 44/3446 428/159 |
| 2009/0233052 A1* | 9/2009 | Thuot | ............... | H01B 7/0233 428/159 |
| 2010/0212935 A1* | 8/2010 | Cho | ............... | H01B 11/1839 174/116 |
| 2011/0198106 A1 | 8/2011 | Sasamura et al. | | |
| 2012/0090865 A1* | 4/2012 | Kato | ............... | H01B 3/308 174/34 |
| 2012/0138332 A1* | 6/2012 | Watanabe | ............... | C08J 9/06 174/120 C |
| 2012/0196115 A1* | 8/2012 | Choe | ............... | B29C 44/10 428/304.4 |
| 2014/0069686 A1 | 3/2014 | Abe et al. | | |
| 2015/0034360 A1 | 2/2015 | Muto et al. | | |
| 2015/0262732 A1* | 9/2015 | Oya | ............... | H01B 3/308 310/195 |
| 2016/0005506 A1* | 1/2016 | Isaka | ............... | H01B 3/445 428/372 |
| 2016/0039162 A1* | 2/2016 | Murphy | ............... | B29C 43/02 521/170 |

FOREIGN PATENT DOCUMENTS

| | | | | |
|---|---|---|---|---|
| CN | 103665679 | | 3/2014 | |
| JP | 2011-162721 | | 8/2011 | |
| JP | WO2014/115623 A | * | 7/2014 | ............... H01B 3/44 |
| WO | 2011/048973 A1 | | 4/2011 | |
| WO | 2014/115623 A1 | | 7/2014 | |

OTHER PUBLICATIONS

PCT/ISA/237 in PCT/JP2016/074040, dated Sep. 13, 2016, partial English translation included, 5 pages.
Chinese Office Action dated Dec. 4, 2018 with English translation, 14 pages.

* cited by examiner

FIG. 6

CABLE CORE AND TRANSMISSION CABLE

TECHNICAL FIELD

The present invention relates to a transmission cable, such as a foamed coaxial cable, which is used, for example, for a medical instrument and the like, and a cable core constituting the transmission cable.

BACKGROUND ART

In a coaxial cable which is used for an electric wire for communication, a foamed coaxial cable formed by constituting a dielectric, provided around a center conductor, by a foamed body has a small dielectric constant of the dielectric and enables high-speed transmission of a signal, and is thus used as a signal transmission cable. For example, in an example of the related art disclosed in Patent Document 1, a foamed insulating cable is used as an electric wire for communication. On the other hand, in a coaxial cable used for a medical instrument and the like, there have recently been demands for a reduction in the diameter of the coaxial cable, with reductions in size and weight and power saving of the medical instrument and the like. For example, the foamed coaxial cable has been used for a transmission cable, such as a medical ultrasonic probe cable and an endoscope cable, which has a large number of conductors, and there have been particularly demands for a reduction in the diameter and flexibility of the cable from the viewpoint of operability.

CITATION LIST

Patent Document

[Patent Document 1] JP-A-2011-162721

SUMMARY OF INVENTION

Problems to be Solved by Invention

For example, an object of the example in the related art disclosed in Patent Document 1 is to form a foamed insulator having a low dielectric constant by solving a problem of cohesion of a foaming nucleating agent. In the example, a foam molded body is molded by kneading different types of polymer materials into a base resin and generating foams at an interface therebetween, so that it is possible to obtain a foamed insulating cable having a small foam diameter, a uniform and high degree of foaming, a low dielectric constant, and a low skew. However, in the example in the related art disclosed in Patent Document 1, the foam diameter is too large to reduce the diameter of the cable, and a technique for maintaining electrical characteristics while achieving a reduction in diameter is not suggested. With respect to foamed coaxial cables in the related art, generally, an effective suggestion has not been made to a technique for realizing both the maintenance of electrical characteristics and a reduction in diameter in the real situation.

In order to maintain electrical characteristics while achieving a reduction in the diameter of the foamed coaxial cable, it is essential to decrease the dielectric constant of a dielectric of a cable core constituting the foamed coaxial cable. In order to decrease the dielectric constant of the dielectric, a method of increasing a foaming rate of a foamed dielectric constituting the dielectric is used. In addition, the thickness of the foamed dielectric is also reduced with the reduction in diameter, it is necessary to further reduce a foamed cell diameter. The foamed cells of the foamed dielectric are enlarged and aggregated as the foaming rate increases, and thus nonuniformity in the foamed cell diameter becomes conspicuous. The nonuniformity in the foamed cell diameter greatly affects characteristics of the cable, the foamed cells directly become irregularities of the external appearance, and there is a problem in the durability, insulating property, and the like of the cable.

The invention has been made in view of the above-described problems, and an object thereof is to provide a technique available for maintaining electrical characteristics while achieving a reduction in the diameter of a cable core.

Means for Solving the Problems

The inventor has found, as a result of wholeheartedly researching into a configuration necessary for a reduction in the diameter of a foamed coaxial cable, that it is possible to maintain electrical characteristics while achieving a reduction in the diameter of a cable core constituting a coaxial cable, with a configuration in which a foaming rate of a foamed dielectric of the cable core is 80% or more, an average foamed cell diameter of the foamed dielectric is 10 μm or less, and a standard deviation of the foamed cell diameter is 2.5 or less.

That is, in order to achieve the above object, a cable core constituting a foamed coaxial cable according to the invention includes: an internal conductor; a foamed dielectric that comprises a fluororesin and is formed on the internal conductor by extrusion molding; and a skin layer that covers the foamed dielectric, in which a foaming rate of the foamed dielectric is 80% or more, an average foamed cell diameter of the foamed dielectric is 10 μm or less, and a standard deviation of a foamed cell diameter of the foamed dielectric is 2.5 or less.

According to the invention, it is possible to provide an extra-fine foamed coaxial cable having excellent electrical characteristics and AWG 40 or greater.

Here, the dielectric of the cable core of the invention includes a foamed dielectric and a skin layer that covers the foamed dielectric. The foamed dielectric is formed of a foamed resin, while the skin layer is formed of a solid resin. The skin layer has a function of insulating an internal conductor and an external conductor from each other, and contributes to flatness of the surface of the foamed dielectric.

The foamed dielectric can be foamed by a known physical foaming method and chemical foaming method known in the related art. Examples of the method include a method in which extrusion molding is performed while introducing a gas such as nitrogen into a foamable composition which is obtained by adding a foaming nucleating agent to a fluororesin, or a method in which a foaming substance pyrolyzed by heating to generate a gas, or the like is mixed into the foamable composition.

Examples of the fluororesin which is the base of the foamed dielectric may include thermoplastic fluororesins such as tetrafluoroethylene-hexafluoropropylene copolymer (FEP), tetrafluoroethylene-perfluoroalkyl vinyl ether copolymer (PFA), ethylene-tetrafluoroethylene copolymer, ethylene-chlorotrifluoroethylene copolymer, polyvinylidene fluoride, and polyvinyl fluoride. These resins may be used individually, or a plurality of types of resins may be combined with each other.

As the foaming nucleating agent, a foaming nucleating agent with an electrical insulating property which does not affect electrical characteristics is preferably used. Specifically, the foaming nucleating agent can be selected from boron nitride, aluminum borate, magnesium borate, potassium titanate, silicon nitride, and the like.

Since the skin layer is a solid resin, it is necessary to thin the skin layer in order to increase a foaming rate of the entire foamed layer, and specifically, it may be necessary to thin the skin layer up to 0.01 mm or less. The skin layer is easily influenced by stress due to the growth of the foamed cell of the foamed dielectric and extension stress of drawn-down during molding by the thinning, and thus it is difficult to stably form the uniform skin layer while keeping balance with the foamed dielectric.

Examples of the resin used for the skin layer may include thermoplastic fluororesins such as tetrafluoroethylene-hexafluoropropylene copolymer (FEP), tetrafluoroethylene-perfluoroalkyl vinyl ether copolymer (PFA), ethylene-tetrafluoroethylene copolymer, ethylene-chlorotrifluoroethylene copolymer, polyvinylidene fluoride, and polyvinyl fluoride. In order to stably mold the thin skin layer, balance between the melt tension and melt flow rate (MFR) of the resin for forming the skin layer is important. The resins may be used individually or a plurality of types of resins may be combined with each other so as to obtain characteristics suitable for the skin layer. Resins respectively used for the foamed dielectric 12 and the skin layer 13 may be different from each other.

The reason why the foaming rate of the foamed dielectric is set to 80% or more is because it is necessary to reduce the dielectric constant of the dielectric in order to maintain electrical characteristics of the cable core while achieving a reduction in diameter. For example, in a case where the resin for forming the dielectric is PFA, the foaming rate is set to 80% or more, and thus the dielectric constant of the dielectric is set to 1.3 or less. In order to increase the foaming rate of the foamed dielectric, it is not preferable that the viscosity of the resin for forming the foamed dielectric is excessively high. An excessively high viscosity interrupts the generation and growth of the foamed cell, and thus it is difficult to increase the foaming rate. On the other hand, a low viscosity makes it easy for the generated foamed cells to be enlarged and aggregated and particularly, it is easier to aggregate the cells as the foaming rate of the foamed dielectric increases.

Since the thickness of the foamed dielectric becomes smaller as the diameter of the cable core decreases, the number of foamed cells capable of being arranged in the thickness direction of the foamed dielectric is reduced. It can be understood that it is necessary to provide as many walls of the foamed cells as possible within the foamed dielectric by reducing the diameter of each foamed cell, in order to maintain the mechanical strength of the foamed dielectric. When an average foamed cell diameter of the foamed body is 10 μm or less, sufficient mechanical strength of the foamed dielectric is obtained even when the center conductor of the cable core is an ultra-fine wire of AWG 40 or greater, and it is possible to prevent transmission characteristics from deteriorating due to crushing of the dielectric even when the cable is bent.

In addition, the thickness of the foamed dielectric becomes smaller as the diameter of the cable core decreases, and a ratio of the foamed cell diameter to the thickness of the foamed dielectric is increased, which results in an increase in the influence of the foamed cell diameter on characteristics of the cable core. In order to obtain satisfactory transmission characteristics as a signal transmission cable, it is necessary to make the foamed cell diameter as uniform as possible. The enlargement and aggregation of the foamed cells make the foamed cell diameter non-uniform and impair the uniformity of the dielectric, and thus sufficient characteristics are not obtained. The average foamed cell diameter of the foamed dielectric is set to 10 μm or less and a standard deviation of the foamed cell diameter is set to 2.5 or less, and thus it is possible to achieve both a reduction in the diameter of the cable core and the maintenance of electrical characteristics.

Further, the foamed cell diameter is set to 10 μm or less, and thus the outer diameter of the cable core is stabilized. When the foamed cell diameter is large, irregularities of the surface of the foamed dielectric are increased, and thus dimensional stability of the thickness of the foamed dielectric is impaired. An unstable thickness of the foamed dielectric causes fluctuations in characteristic impedance and the reflection of a signal when the transmission cable is adopted, which leads to an undesirable result. The outer diameter of the cable core is reduced in a thinned portion of the foamed dielectric, and thus a load due to an external force is concentrated on the portion having a small outer diameter, which results in a reduction in the mechanical strength of the cable core and the deterioration of external appearance due to the irregularities. The average foamed cell diameter of the foamed dielectric is 10 μm or less and a standard deviation of the outer diameter mm of the cable core is set to 0.012 or less, and thus it is particularly possible to obtain the transmission cable with stable electrical characteristics.

In the cable core of the invention, it is preferable that the center conductor of the cable core is an ultra-fine wire of AWG 40 or greater. For example, excellent effects are obtained with ultra-fine wires of AWG 44, AWG 46, and AWG 48.

BRIEF DESCRIPTION OF DRAWINGS

FIGS. 1A and 1B are diagrams illustrating a configuration of a foamed coaxial cable including a cable core according to an embodiment of the invention as a main component; FIG. 1A is a diagram when seen from an axial direction, and FIG. 1B is a diagram when seen from a direction perpendicular to the axis.

EMBODIMENTS FOR CARRYING OUT THE INVENTION

An embodiment to be described below does not limit the invention according to the scope of claims, and all combinations of features described in the embodiment are not necessarily essential to the establishment of the invention.

Figure 1A:
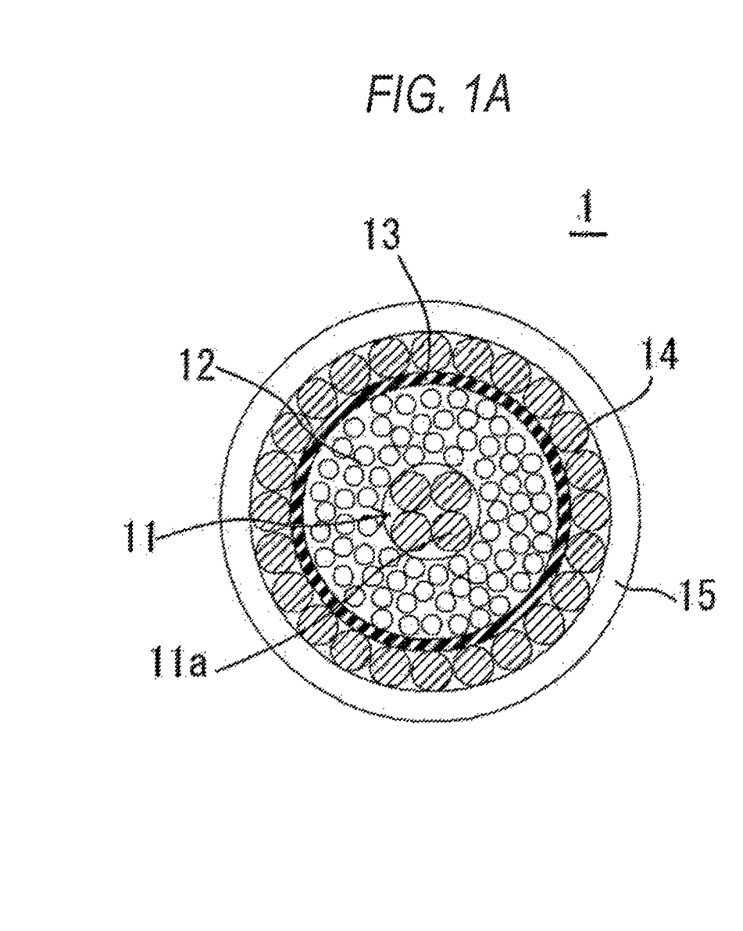
Figure 1B:
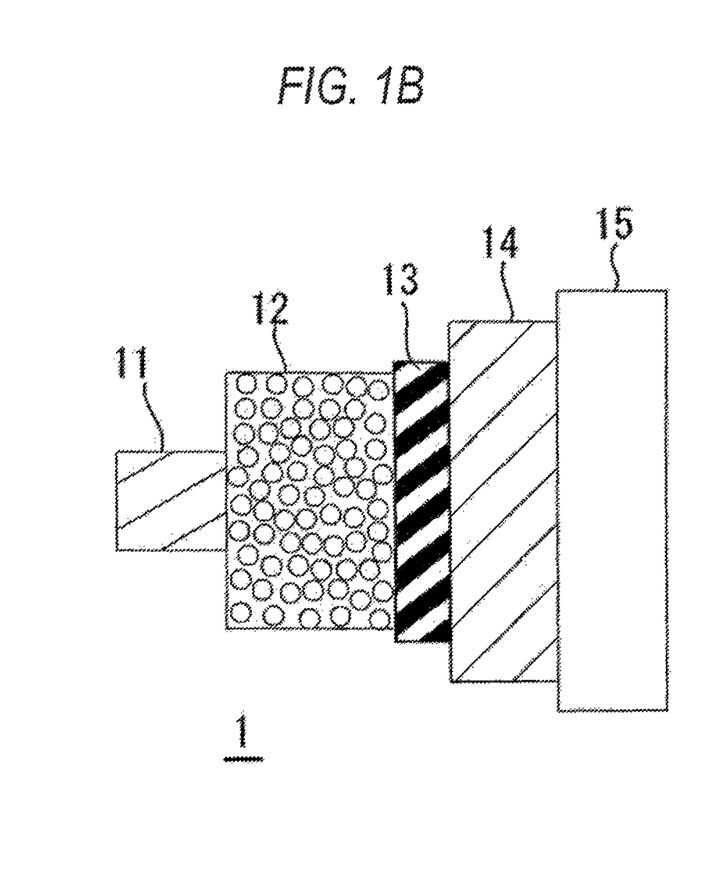

FIGS. 1A and 1B are diagrams illustrating a configuration of a foamed coaxial cable including a cable core according to an embodiment of the invention as a main component; FIG. 1A is a diagram when seen from an axial direction, and FIG. 1B is a diagram illustrating the structure of the cable. A foamed coaxial cable 1 according to this embodiment is configured such that an external conductor 14 is disposed on the outer circumference of a cable core which mainly includes an internal conductor 11, a foamed dielectric 12 which comprises a fluororesin and is formed on the internal conductor 11 by extrusion molding, and a skin layer 13 that covers the foamed dielectric 12. The foamed coaxial cable is configured such that a foaming rate of the foamed dielectric 12 is 80% or more, an average foamed cell diameter of the foamed dielectric 12 is 10 μm or less, and a standard deviation of the foamed cell diameter is 2.5 or less. In addition, a jacket 15 (sheath) is formed on the outer circumference of the external conductor 14. The foamed dielectric 12 which is a characteristic portion of the invention is formed of the above-described foamed resin obtained by foaming a foamable composition containing a foaming nucleating agent.

The foamed coaxial cable 1 configured in this manner is formed by the following procedure. First, the foamed dielectric 12 and the skin layer 13 are formed together on the outer circumference of the internal conductor 11 by extrusion using an extruder (to be described later) to create the cable core. A foaming gas such as nitrogen is injected into the foamable composition of the foamed dielectric 12 which is melted within the extruder, the foamed dielectric 12 formed of the foamed resin is formed, and the skin layer 13 is formed to cover the outer circumference of the foamed dielectric 12. The foamed dielectric 12 is formed of the foamed resin, while the skin layer 13 is formed of a solid resin. In order to realize the configuration of the foamed coaxial cable of the invention, it is preferable to reduce a difference in the temperature of the entire foamed dielectric as much as possible in order to uniformly foam the foamed dielectric 12. This is because speeds of the generation and growth of the foamed cell are different from each other depending on the temperature of the resin. The temperature of the foamed dielectric becomes uniform, and thus the generation and growth of all of the foamed cells are performed at the same time. As a result, the foamed dielectric having a small and uniform foamed cell diameter is obtained. In order to reduce a difference in temperature between the vicinity of the outer surface of the foamed dielectric which has the highest temperature and the vicinity of the internal conductor which has the lowest temperature as much as possible, it is preferable to adopt means for covering the internal conductor with a foamed dielectric by extrusion and simultaneously heating an extrusion resin from the outside and the internal conductor.

It is considered that the foaming of a foamed dielectric of a cable core of the related art is performed by the following mechanism. In a case where a foamable composition is extruded, for example, an extruder having a foamable composition melted is filled with a foaming gas, and the foaming gas is melted in the foamable composition. The foaming gas melted in the foamable composition adsorbed into a foaming nucleating agent in the foamable composition, and thus the concentration of the foaming gas in the vicinity of the foaming nucleating agent is increased. When the foamable composition comes out of a die of the extruder and the pressure of a resin is lowered, foaming is started in the vicinity of the foaming nucleating agent. In this case, a speed at which the pressure of the resin is lowered is not uniform in the entire foamed dielectric. In general, since stress acts on the resin in a direction perpendicular to the extrusion direction of the extruder in the melted state of the resin, pressure first starts to be lowered from the outer surface of the foamed dielectric. On contrary, pressure starts to be lowered late on the internal conductor side. Since the pressure of the resin at the start of foaming is non-uniform, the foamed cell is biasedly generated and grown on the outer surface of the foamed dielectric in this state, which results in the enlargement and aggregation of the foamed cells. On contrary, foaming cannot be sufficiently performed on the internal conductor side of the foamed dielectric.

Here, the skin layer 13 also has an effect of suppressing the enlargement and aggregation of the foamed cells of the foamed dielectric 12 and making the foamed cell diameter fine. The foamed dielectric and the skin layer are simultaneously extruded to hold the foamed dielectric from the outside and reduce the speed at which the pressure of the resin on the outer surface of the foamed dielectric is lowered, which leads to an effect of reducing a difference in pressure in the entire layer of the foamed dielectric. At this time, the melt tension of the resin for forming the skin layer is required to be adjusted in a range of tension that does not interrupt foaming while suppressing sudden decompression on the outer surface of the foamed dielectric. In addition, the skin layer 13 is required to have an extremely small thickness in order to increase a foaming rate of the entire dielectric, and thus it is necessary to increase MFR of the resin for forming the skin layer 13. Regarding the resin for forming the skin layer 13, a balance between a melt tension and MFR is important. Variations in the temperature and pressure of the resin during the foaming of the foamed dielectric are reduced, and thus it is possible to realize the foamed dielectric having a high foaming rate, a minute foamed cell diameter, and a uniform foamed cell diameter. Therefore, it is possible to realize the cable core maintaining electrical characteristics while achieving a reduction in diameter.

The foamed cell diameter of the foamed dielectric obtained as described above is 10 μm or less, and a standard deviation of the foamed cell diameter is 2.5 or less. Subsequently, the external conductor 14 is formed on the outer circumference of the cable core. The external conductor 14 is formed by laterally winding or weaving a plurality of conductor strands 14a at a predetermined angle (screw shape) with respect to a longitudinal axis direction, is formed by winding metal foil, or is formed by any method such as evaporation of metal microparticles. Finally, the jacket 15 is formed by winding a resin tape on the outer circumference of the external conductor 14 at a predetermined angle (screw shape) with respect to a longitudinal axis direction or by extruding a resin and covering the outer circumference of the external conductor with the resin, thereby completing the foamed coaxial cable 1.

A conducting wire 11a is constituted by a stranded conductor or a solid wire. The conducting wire is formed of a material such as a copper wire, a silver wire, an aluminum wire, and various alloy wires. In general, a conducting wire of which the surface is plated with silver, tin, or the like is used. For example, a silver-plated copper alloy wire and the like are used. As the material of the conductor strand 14a or the metal foil, any material such as a copper alloy and silver-plated annealed copper can be used. As the material of the jacket 15, not only a fluororesin but also a general resin, for example, polyolefin, polyvinyl chloride, polyester, and the like can be used.

Figure 2:
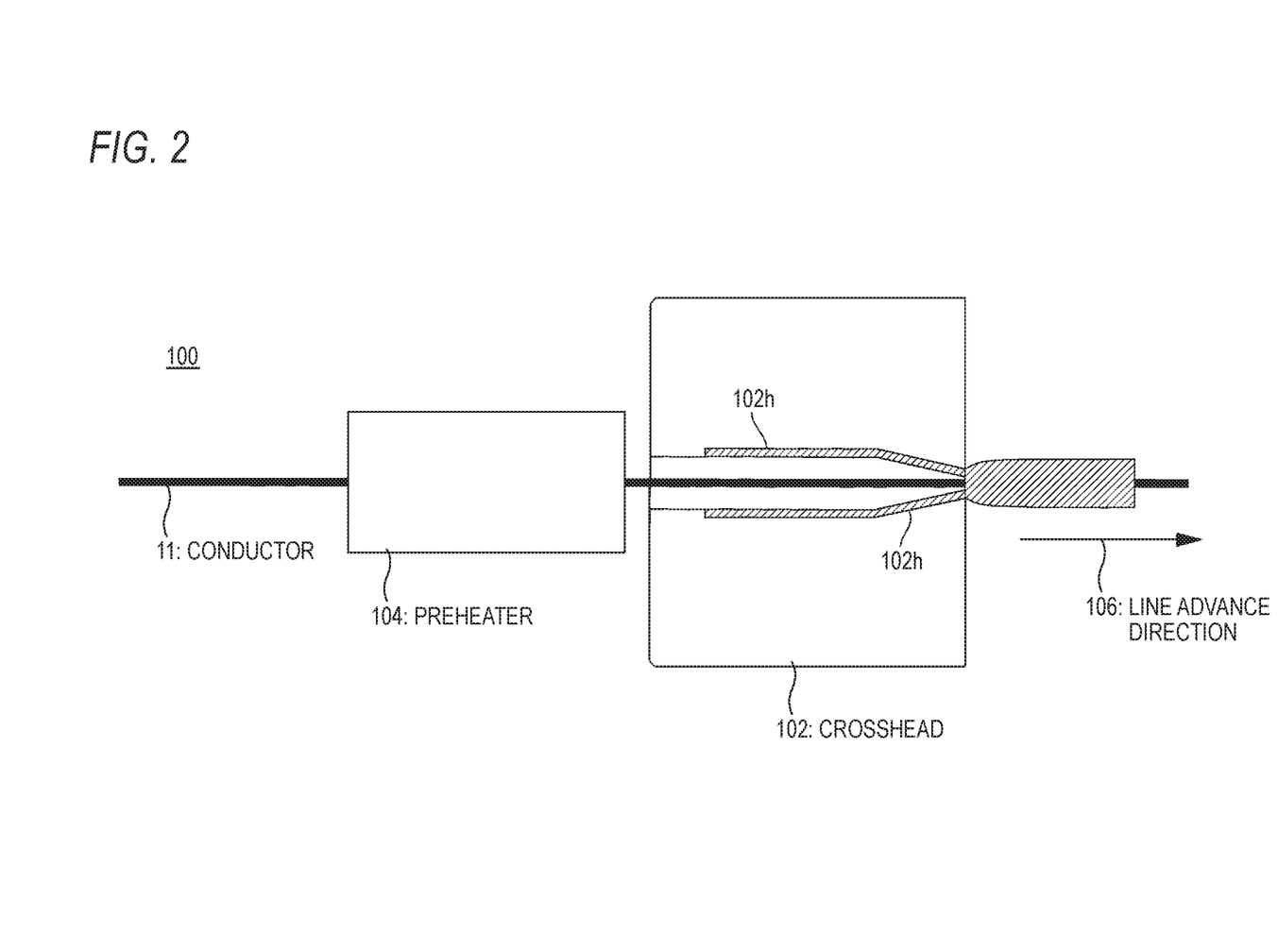
FIG. 2 is a diagram illustrating an extrusion molding method for the cable core according to the embodiment of the invention.

A method of manufacturing a cable core according to this embodiment will be described in detail. FIG. 2 is a diagram illustrating an extrusion molding method for the cable core according to this embodiment, and illustrates a schematic configuration of an extrusion machine. In order to realize the configuration of the cable core of the invention, it is necessary to uniformly foam the foamed dielectric. For this, it is preferable to reduce a difference in the temperature of the resin in the entire foamed dielectric as much as possible. It is preferable that a difference in temperature between a portion having the highest temperature and a portion having the lowest temperature is set to 10° C. or less. In this embodiment, when the internal conductor 11 is covered with the foamed dielectric 12 by extrusion, a method (preheating) is adopted in which the internal conductor 11 is covered while first heating the internal conductor 11, at the same time when the extrusion resin is heated from the outside. An extrusion machine 100 illustrated in FIG. 2 includes a crosshead 102 for extruding the foamed layer and the skin layer together, and a preheater 104. Reference numeral 11 denotes an internal conductor of the cable core, and an arrow 106 indicates an advance direction of a line. Reference numeral 102$h$ denotes a portion where a heater heating a resin in the crosshead 102 is disposed. The internal conductor 11 is first heated (preheated) by the preheater 104, in addition to the heating of the extrusion resin from the outside based on a heating structure of the extrusion machine 100. Thereby, the conductor side in the foamed dielectric 12 is also heated by heat transmitted from the heated internal conductor 11, and thus it is possible to effectively prevent the occurrence of a difference in temperature between the outer side and the conductor side in the foamed dielectric 12.

Figure 3:
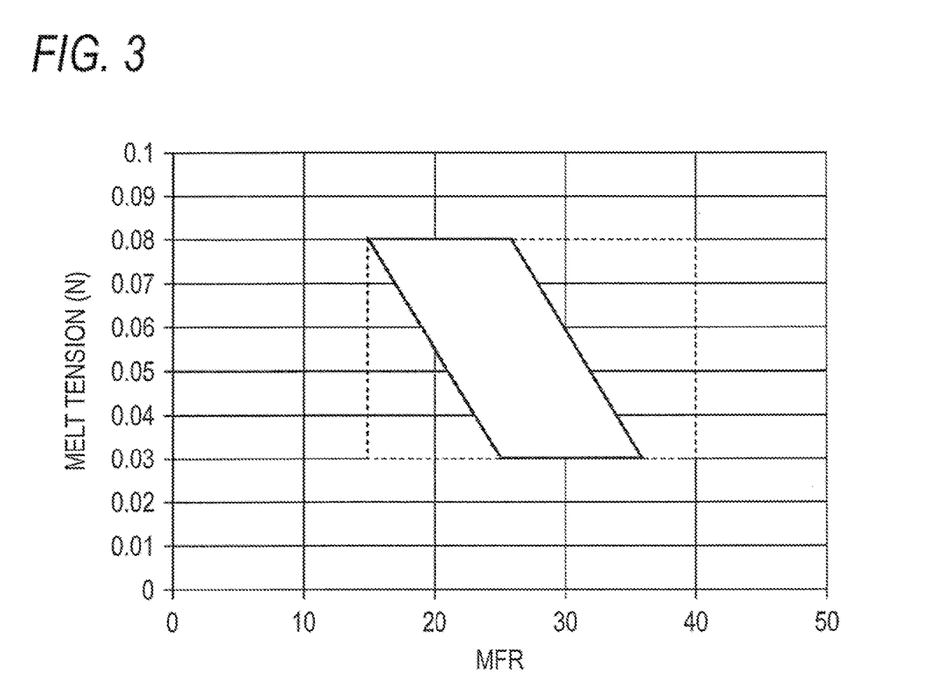
FIG. 3 is a correlation diagram illustrating a melt viscosity and a preferred range of MFR of a resin for forming a skin layer of the cable core according to the embodiment of the invention.

In the skin layer extruded together with the foamed dielectric, the selection of a resin, extrusion conditions, and the like are adjusted in consideration of a balance between a melt tension and MFR and a balance with stress during the foaming of the foamed dielectric of the resin for forming the skin layer. The melt tension and the MFR vary depending on the dimension of the cable core, the thickness of the skin layer, and the like. However, in the size of the cable core of the invention, a melt tension in a case of measurement at 380° C. may be set to approximately 0.03 N to 0.08 N and MFR may be set to approximately 15 to 40 g/min. In FIG. 3, the above-described appropriate ranges of the melt tension and the MFR are indicated by a dotted quadrangle. Since a balance between the melt tension and the MFR is important, a range surrounded by a quadrilateral in FIG. 3 is particularly preferable among the above-described ranges.

Main points of the method of manufacturing a cable core according to this embodiment will be described below.

Example 1

Extrusion molding was performed on a foamable composition containing tetrafluoroethylene-perfluoroalkyl vinyl ether copolymer (PFA420HP-J manufactured by Mitsui•Du Pont Fluorochemical) of 99.5% by mass and aluminum borate whisker (Alborex Y manufactured by Shikoku Chemicals Corporation) of 0.5% by mass at a temperature of 400° C. in a die of an extruder. Nitrogen of 0.7 MPa was injected into the extruder to form a foamed dielectric having an outer diameter of 0.15 mm on a silver plated annealed copper wire of 0.05 mm, which was preheated at 405° C., by foaming molding. At the same time as the covering of the foamed dielectric, PFA based on PFA420HP-J which was adjusted so as to have a melt tension of 0.04 N and MFR of 30 was extruded from another connected extruder to thereby form the skin layer on the outer surface of the foamed dielectric.

The capacitance of the obtained foamed dielectric was measured, a dielectric constant ε was obtained by the following Numerical Expression 1, and a foaming rate V (%) was obtained by the following Numerical Expression 2 on the basis of the obtained dielectric constant.

$$\varepsilon = (C \times \log(D/d))/24.16 \qquad \text{[Numerical Expression 1]}$$

Here, C: capacitance (pF) per 1 m
D: dielectric outer diameter (mm)
d: diameter of conductor (mm)

$$V = (1 - \log \varepsilon / \log \varepsilon f) \times 100 \qquad \text{[Numerical Expression 2]}$$

Figure 4A:
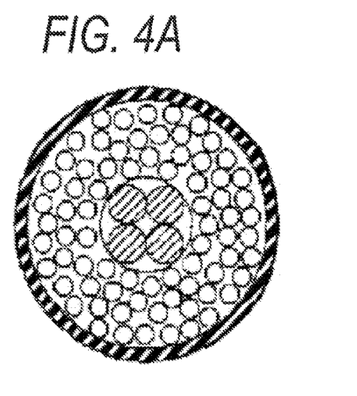
FIG. 4A is a schematic cross-sectional view of the cable core according to the embodiment of the invention.

Here, εf: dielectric constant before foaming of composition constituting foamed dielectric FIG. 4A is a schematic diagram of a microscope photograph obtained by cutting off the cable core according to this embodiment along a surface perpendicular to the axial direction and observing the cross-section of the cable core by an optical microscope (KH-2700 manufactured by HIROX).

A foamed cell diameter was calculated from an image of the microscope photograph of the cross-section. Regarding the foamed cell, an oval-shaped foamed cell is also included, and thus conversion into a circle was performed by the following Numerical Expression 3.

$$\text{Foamed cell diameter} = (\text{maximum cell diameter} + \text{minimum cell diameter})/2 \qquad \text{[Numerical Expression 3]}$$

A foamed cell diameter was calculated with respect to 50 foamed cells or all of the foamed cells confirmable by the sectional image, and the average thereof was set to be an average foamed cell diameter.

The outer diameter of the cable core was calculated from the image of the optical microscope photograph of the cross-section obtained by cutting off the cable core along a surface perpendicular to the axial direction. The outer diameter was measured in four directions with respect to one cross-section, and an average thereof was set to be a cable core outer diameter. The cable core outer diameter was measured at any 50 locations to obtain a standard deviation of the cable core outer diameter.

Comparative Example 1

Figure 4B:
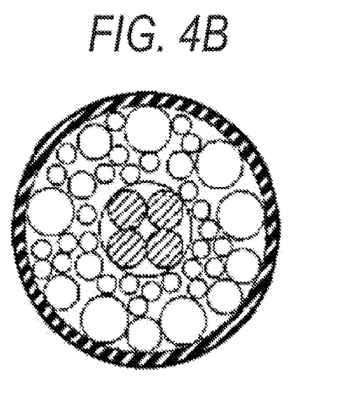
FIG. 4B is a schematic cross-sectional view of a cable core of the related art according to a comparative example.

Preheating of a conductor was not performed in the foamable composition used in Example 1, a cable core was created in the same manner as that in Example 1 except that a melt tension of a resin for forming a skin layer was set to 0.018 N and MFR was set to 35, and a capacitance was measured in the same manner as in Example 1. In addition, the obtained cable core was cut off along a surface perpendicular to the axial direction, and the cross-section was observed by an optical microscope photograph. FIG. 4B is a schematic diagram of a microscope photograph of the cross-section. An average foamed cell diameter and a standard deviation of a foamed cell diameter were obtained from an image of the microscope photograph in the same manner as in Example 1.

In the cable core according to Example 1 of FIG. 4A, a foaming rate of the dielectric is improved as compared to the cable core according to Comparative Example 1 of FIG. 4B. That is, firstly, a foaming rate of the foamed dielectric 12 is higher, and secondly, the skin layer 13 is thinner than that of the cable core according to Comparative Example 1. In the cable core according to Comparative Example 1, foamed cells in the vicinity of the outer surface of the foamed dielectric are enlarged and aggregated, and thus nonuniformity in the foamed cell diameter of the foamed dielectric becomes conspicuous. On the other hand, in the foamed dielectric of the cable core according to Example 1, the enlargement and aggregation of the foamed cells are suppressed, and the diameter of the cell is uniform as compared to that in Comparative Example 1. Therefore, it is possible to prevent adverse influences on electrical characteristics of the cable, which results from the nonuniformity of the foamed cell diameter, and to effectively prevent a problem from occurring in the durability, insulating property, and the like of the cable because irregularities in the external appearance are also decreased. With regard to the second respect, also in a case where the foamed layer and the skin layer are extruded together, it is possible to thin the skin layer to mold the uniform skin layer.

When an example of the foamed coaxial cable of the invention was experimentally manufactured, a foaming rate of a foamed dielectric was set to 80% to 90% and the thickness of a skin layer was set to 0.006 μm to 0.008 μm, and thus it was possible to mold a cable having a dielectric outer diameter φ of 0.15 mm or less while maintaining a capacitance of 60 pF/m. Main dimensions, foaming rates, capacitances, average foamed cell diameters, and the like of the foamed cables according to the example and the comparative example of the foamed cable of the invention are shown in Table 1.

TABLE 1

|  | Example 1 | Comparative Example 1 |
|---|---|---|
| Size of conductor | AWG 46 | AWG 46 |
| Diameter of conductor (mm) | 0.05 | 0.05 |
| Outer diameter of dielectric (mm) | 0.15 | 0.17 |
| Thickness of dielectric foamed layer (mm) | 0.042 | 0.05 |
| Thickness of skin layer (mm) | 0.008 | 0.01 |
| Foaming rate of foamed layer (%) | 90 | 65 |
| Foaming rate of dielectric (%) | 62 | 45 |
| Capacitance (pF/M) | 61 ± 2.5 | 61 ± 2.5 |
| Average cell diameter (μm) | 8.14 | 19.2 |
| Standard deviation of average cell diameter | 2.1 | 5.7 |

As shown in Table 1, regarding the foamed cable according to Example 1 foamed cable, the outer diameter (mm) of the core was reduced from 0.17 to 0.15, and the thickness (mm) of the skin layer and the foaming rate of the foamed dielectric were significantly improved from 0.01 to 0.008 and from 65% to 90%, respectively, as compared to Comparative Example 1, while maintaining electrical characteristics.

Example 2

A silver plated annealed copper wire of 0.09 mm was used as a conductor, and a foamed dielectric was formed on the conductor and a skin layer was formed on the outer surface of the foamed dielectric at the same time. A cable core having an outer diameter of 0.33 mm was created in the same manner as in Example 1 except that a melt tension of a resin for forming the skin layer was set to 0.08 N and MFR was set to 15.

Comparative Example 2

A silver plated annealed copper wire of 0.09 mm was used as a conductor, and a cable core having an outer diameter of 0.35 mm was created in the same manner as in Comparative Example 1 except that a melt tension of a resin for forming a skin layer was set to 0.05 N and MFR was set to 10.

Example 3

A silver plated annealed copper wire of 0.06 mm was used as a conductor, and a foamed dielectric was formed on the conductor and a skin layer was formed on the outer surface of the foamed dielectric at the same time. A cable core having an outer diameter of 0.19 mm was created in the same manner as in Example 1 except that a melt tension of a resin for forming the skin layer was set to 0.07 N and MFR was set to 27.

Example 4

A silver plated annealed copper wire of 0.05 mm was used as a conductor, nitrogen of 0.8 MPa was injected into an extruder, and a foamed dielectric was formed on the conductor. A skin layer was formed on the outer surface of the foamed dielectric at the same time as the covering of the foamed dielectric. A cable core having an outer diameter of 0.14 mm was created in the same manner as in Example 1 except that a melt tension of a resin for forming the skin layer was set to 0.03 N and MFR was set to 25.

Example 5

A silver plated annealed copper wire of 0.039 mm was used as a conductor, and a foamed dielectric was formed on the conductor and a skin layer was formed on the outer surface of the foamed dielectric at the same time. A cable core having an outer diameter of 0.133 mm was created in the same manner as in Example 1 except that a melt tension of a resin for forming the skin layer was set to 0.03 N and MFR was set to 35.

Regarding the examples and the comparative examples, an average foamed cell diameter and a standard deviation of a foamed cell diameter were obtained in the same manner as in Example 1.

Main dimensions, foaming rates, capacitances, average foamed cell diameters, and the like of the foamed cables according to the examples and the comparative examples of the foamed cable of the invention are shown in Table 2.

TABLE 2

|  | Example 2 | Comparative Example 2 | Example 3 | Example 4 | Example 5 |
|---|---|---|---|---|---|
| Size of conductor | AWG 40 | AWG 40 | AWG 44 | AWG 46 | AWG 48 |
| Diameter of conductor (mm) | 0.09 | 0.09 | 0.06 | 0.05 | 0.039 |
| Outer diameter of core (mm) | 0.33 | 0.35 | 0.19 | 0.14 | 0.133 |
| Thickness of foamed layer (mm) | 0.113 | 0.123 | 0.058 | 0.039 | 0.041 |
| Thickness of skin layer (mm) | 0.007 | 0.007 | 0.007 | 0.006 | 0.006 |
| Foaming rate of foamed layer (%) | 84 | 69 | 85 | 95 | 82 |
| Whole foaming rate (%) | 79 | 59 | 64 | 67 | 61 |
| Capacitance (pF/M) | 51 ± 2.5 | 51 ± 2.5 | 51 ± 2.5 | 61 ± 2.5 | 54 |
| Average cell diameter (μm) | 8.7 | 15.3 | 9.8 | 5.8 | 7.7 |

TABLE 2-continued

|  | Example 2 | Comparative Example 2 | Example 3 | Example 4 | Example 5 |
|---|---|---|---|---|---|
| Standard deviation of average cell diameter | 2.2 | 4.9 | 2.5 | 1.8 | 2.3 |

As shown in Table 2, regarding the foamed cable according to Example 2, the outer diameter (mm) of the core is reduced from 0.35 to 0.33, as compared to Comparative Example 2 having the same capacitance as that in Example 2. Regarding Examples 3 to 5, a foaming rate is set to 80% or more, an average foamed cell diameter is set to 10 μm or less, and a standard deviation of the foamed cell diameter is set to 2.5 or less by suppressing the aggregation of the foamed cells, and thus electrical characteristics are maintained even when the diameter of the cable core is reduced.

Regarding the examples and the comparative examples, a standard deviation of a cable core outer diameter was obtained in the same manner as in Example 1.

Standard deviations of the cable core outer diameters, and the like according to the examples and the comparative examples of the cable core of the invention are shown in Table 3.

Figure 5:
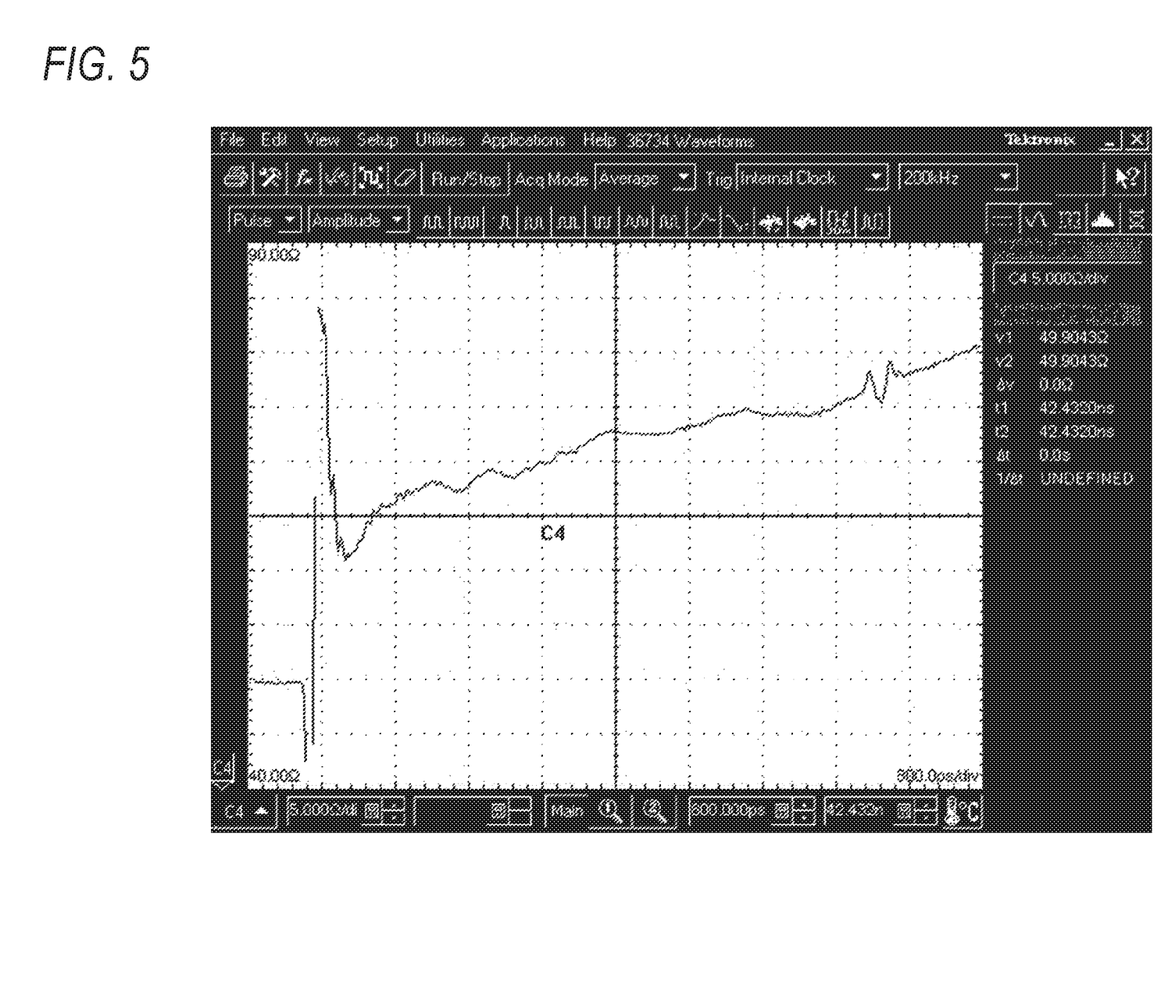
FIG. 5 shows a TDR curve of a coaxial cable using a cable core in which a standard deviation of a cable core outer diameter mm exceeds 0.012.
Figure 6:
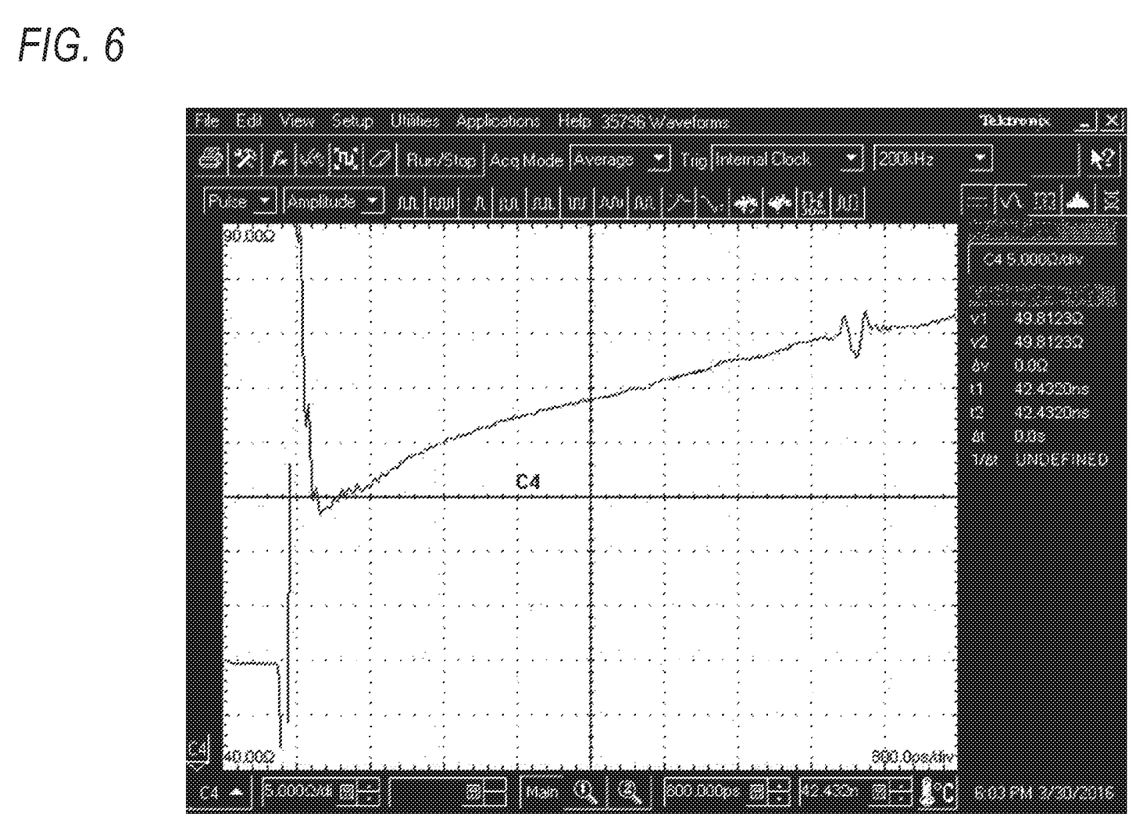
FIG. 6 shows a TDR curve of a coaxial cable using a cable core in which a standard deviation of a cable core outer diameter mm is 0.012 or less.

In addition, regarding a coaxial cable created using the cable core according to Example 1, a TDR curve based on results obtained by performing Time Domain Reflectmetry (TDR) measurement is illustrated in FIG. 5. Similarly, regarding a coaxial cable created using the cable core according to Example 2, TDR curve based on results obtained by performing TDR measurement is illustrated in FIG. 6.

TABLE 3

|  | Example 1 | Comparative Example 1 | Example 2 | Comparative Example 2 | Example 3 | Example 4 | Example 5 |
|---|---|---|---|---|---|---|---|
| Average outer diameter of cable core (mm) | 0.15 | 0.17 | 0.33 | 0.35 | 0.19 | 0.14 | 0.133 |
| Standard deviation of outer diameter of cable core (mm) | 0.015 | 0.022 | 0.012 | 0.026 | 0.020 | 0.004 | 0.003 |
| Average cell diameter (μm) | 8.14 | 19.2 | 8.7 | 15.3 | 9.8 | 5.8 | 7.7 |
| Standard deviation of average cell diameter (μm) | 2.1 | 5.7 | 2.2 | 4.9 | 2.5 | 1.8 | 2.3 |

In the cable core according to Example 1, it can be understood that the standard deviation of the outer diameter of the core is greater than 0.012 mm, there is a disturbance in a waveform of the TDR curve indicating characteristic impedance of FIG. 5, and the characteristic impedance fluctuates depending on the position of the cable. In the cable core according to Example 2, the standard deviation of the outer diameter of the core is 0.012 mm or less, a waveform of the TDR curve illustrated in FIG. 6 is stabilized, and a transmission cable with stable electrical characteristics is particularly obtained.

As described above, according to the cable core of the invention, the enlargement and aggregation of the foamed cells are suppressed regardless of a high foaming rate of the foamed dielectric. It is possible to obtain the cable core having a high foaming rate of the foamed dielectric, a small foamed cell diameter, and a uniform foamed cell diameter of the entire foamed dielectric. Accordingly, in the foamed coaxial cable including the cable core as a main component, it is possible to maintain electrical characteristics equivalent to those when the diameter of the cable is large, while achieving a reduction in diameter.

INDUSTRIAL APPLICABILITY

A foamed coaxial cable including a cable core of the invention as a main component can also be applied not only to electronic equipment such as a medical instrument, a communication equipment, and a computer, but also to control circuits of machines, such as an automobile and an airplane, in which a control equipment is required to be mounted on a narrow portion.

REFERENCE SIGNS LIST

1: foamed coaxial cable
11: internal conductor
11a: conducting wire
12: foamed dielectric
13: skin layer
14: external conductor
15: jacket

The invention claimed is:
1. A cable core comprising:
an internal conductor;
a foamed dielectric that comprises a fluororesin and is formed on the internal conductor by extrusion molding; and
a skin layer that covers the foamed dielectric,
wherein
a foaming rate of the foamed dielectric is 80% or more,
an average foamed cell diameter of the foamed dielectric is 10 μm or less, and
a standard deviation of a foamed cell diameter of the foamed dielectric is 2.5 or less.
2. The cable core according to claim 1,
wherein a standard deviation of a cable core outer diameter mm of the cable core is 0.012 or less.
3. The cable core according to claim 2,
wherein the internal conductor is an ultra-fine wire of AWG 40 or greater.
4. The cable core according to claim 1,
wherein the internal conductor is an ultra-fine wire of AWG 40 or greater.

5. A transmission cable for transmitting a signal comprising a cable core according to claim 1.

\* \* \* \* \*